April 29, 1947.  P. CROSLEY, 3D  2,419,765
METHOD AND APPARATUS FOR FABRICATING ARTICLES
Filed April 25, 1944   2 Sheets-Sheet 1
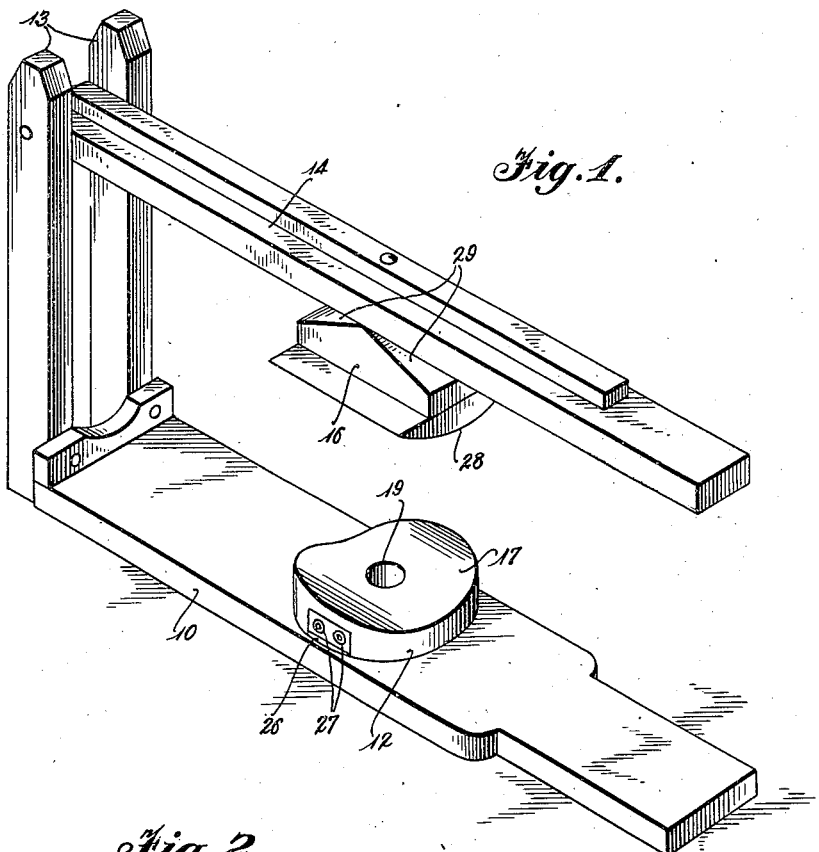
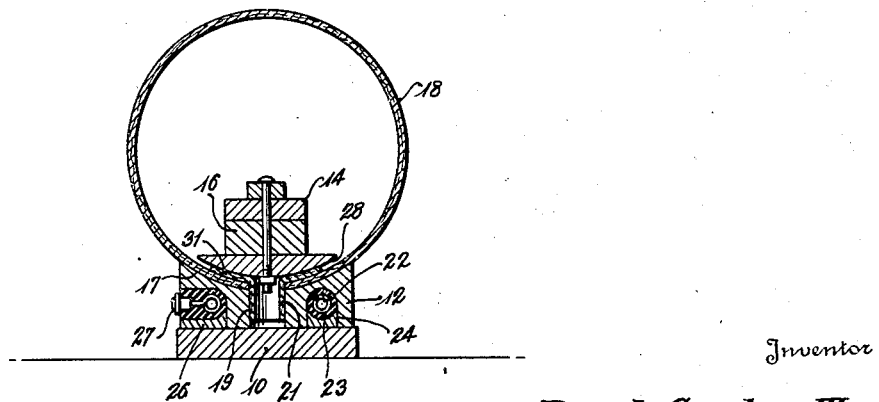
Inventor
*Powel Crosley, III*
By *Bacon & Thomas*
Attorneys

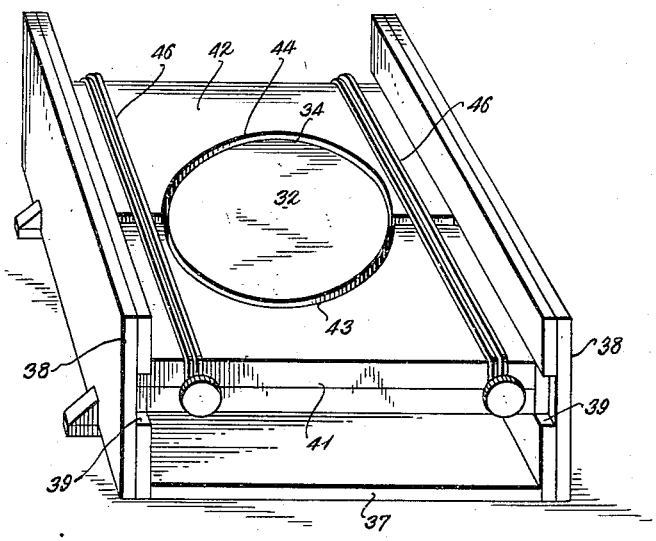
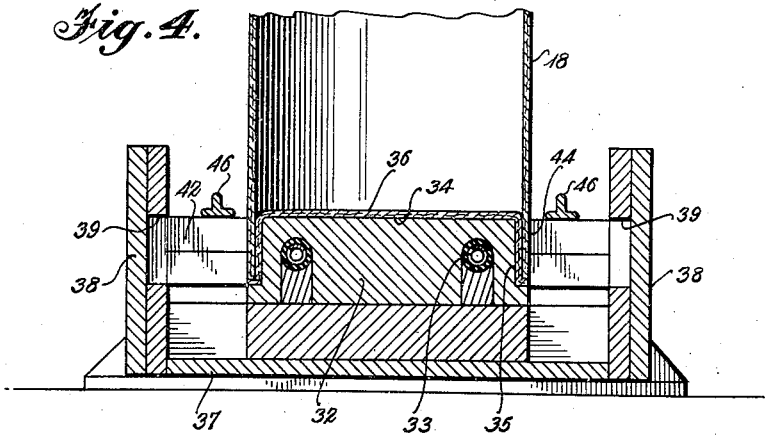

Patented Apr. 29, 1947

2,419,765

UNITED STATES PATENT OFFICE 2,419,765

METHOD AND APPARATUS FOR FABRICATING ARTICLES

Powel Crosley, III, Coral Gables, Fla.

Application April 25, 1944, Serial No. 532,667

9 Claims. (Cl. 93—55.1)

This invention relates to a method and apparatus for fabricating articles and more particularly to a method and apparatus for securing together tubular fibrous members having a synthetic resin binder by employing a synthetic resin to weld said articles together.

The invention has particular utility in the making of relatively large water containers or other liquid containers such as tanks, buckets, water breakers, etc. Fibrous materials impregnated with synthetic resins which set to a substantially infusible and insoluble state are substantially weatherproof and resistant to action by water and other liquids such as most organic solvents, motor fuels, etc. Also containers fabricated from resin impregnated fibrous material are lighter in weight, less expensive and are less likely to dent or distort than metal containers of the same capacity. It has, however, been difficult to produce closed or substantially closed containers unless resort is had to molding a complete seamless article employing expensive molds and requiring the handling of loose fibrous pulp. The wall structures of such molded articles do not have the mechanical strength which can be obtained in built up containers using laminated fibrous materials. When, however, it has been attempted to produce containers built up of various elements, a large number of leaks result from improper formation of seams. Unless the various members being secured together by a synthetic resin adhesive or other material are brought into close contact, faulty seams are produced, which either result in immediate leakage or in which leaks soon develop. That is to say, the resin film between the various elements of the container must be continuous and yet be very thin as thick masses of synthetic resins are ordinarily brittle and easily cracked to produce leaks during use of the container.

In accordance with the present invention a method and apparatus are provided for holding the various surfaces of the container which are to be adhesively secured or welded together by the synthetic resin in close contact with each other while heat is applied to fuse the resin and weld the surfaces together and then cure or set the resin into a substantially insoluble and infusible state.

It is, therefore, an object of the present invention to provide an improved process and apparatus for making adherent joints between tubular fibrous members containing a synthetic resin binder.

Another object of the invention is to provide an apparatus and method wherein tubular fibrous elements having a synthetic resin binder and a coating of unreacted synthetic resin are clamped in close contact and the resin fused and cured.

A further object of the invention is to provide an improved apparatus and method for inserting end walls in tubular fibrous containers and securing the same in leakproof relation therein.

A still further object of the invention is to provide a method and apparatus for inserting a filler neck into a tank or other liquid container made of fibrous material having a synthetic resin binder for securely adhering said filler neck in leakproof relation with said container.

Other objects and advantages of the invention will appear in the following description of the preferred embodiments shown in the attached drawing of which:

Figure 1 is a perspective view of an apparatus particularly suitable for inserting filler necks in fibrous containers;

Figure 2 is a vertical section showing the container and filler neck in position in the apparatus of Figure 1;

Figure 3 is a view similar to Figure 1 showing an apparatus particularly suitable for inserting end walls in a tubular fibrous container; and Figure 4 is a vertical section through the apparatus of Figure 3 showing the end wall and a portion of the container in position in the apparatus.

Referring more particularly to the drawings, the apparatus of Figure 1 may include a base member 10 supporting a lower die member 12 and provided with standards 13 pivotally supporting a lever 14 carrying an upper die member 16. The lower die member 12 may have an upper surface 17 conforming to the outer surface of a tubular container body 18 as shown in Figure 2, and may have a central aperture 19 for receiving a tubular filler neck 21. The lower die member 12 is shown as being provided with an interior heating element 22 which may be an electrical resistance heating element suitably insulated from the die member 12 as indicated at 23. The insulating heating element 22 may be positioned in an annular groove 24 in the lower surface of the die member, which groove has its lower portion closed with a suitable plate or closure 26. The annular groove 24 may have an offset portion extending to one side of the die element to provide electrical connections 27. The upper die member 16 may have a lower surface 28 conforming to the interior surface of the container member 18 and have relieved portions 29 on its upper surface providing for alignment of the surface 28 of the upper die member with the flanged end 31 of the filler neck 21.

In carrying out the process of the present invention in the apparatus of Figure 1, a tubular body member 18 for the container is first fabricated in any known or suitable manner, such as by wrapping upon a cylindrical form a fibrous material impregnated with a synthetic resin in solution in a solvent, drying the resin solvent and curing the resin under heat and pressure. An aperture to receive the filler neck 21 may be formed in the body 18 either during the initial fabrication thereof or later cut therein in any known or suitable manner. The filler neck 21 may likewise be initially fabricated in any known or suitable manner, the preferred method being to mold the same from a sheet of laminated fibrous material impregnated with a solution of synthetic resin using suitable forming dies. The completed container body 18 is placed over the lever 14 of the apparatus of Figure 1 and the preformed filler neck 21 inserted through the above-mentioned aperture in the container body and into the aperture 19 of the lower die member 12. Prior to placing these members in the apparatus of Figure 1, the surfaces which are to be welded together are preferably coated with a solution of synthetic resin and the solvent thereof allowed to dry so that thin films of synehtic resin in partially reacted form are present upon the engaging surfaces.

The lower die element 12 is preferably made of metal and in most cases is maintained in heated condition during the welding of filler necks into a plurality of container bodies. Upon applying pressure between the upper and lower die members by means of the lever 14 the synthetic resin films of the engaging surfaces are fused together and the resin set to a substantially insoluble and infusible state. Since the pressure is applied uniformly around the surfaces being welded and thin coatings of the resin are employed, a uniform thin bond of the resin is produced between the filler neck and body of the container which resin merges with the resin binder of these fibrous elements to produce a substantially leakproof and substantially shockproof joint.

The apparatus of Figures 3 and 4 is particularly adapted for securing end walls in a container body. This apparatus includes a lower die member 32 containing a heating element such as an electrical heating element 33 suitably insulated from the die member and having upper and side surfaces 34 and 35 conforming to the interior of a preformed end wall 36. The lower die member 32 is supported in a frame structure 37 having upstanding side walls 38 containing guideways 39 receiving the side edges of clamping members 41 and 42. The clamping members 41 and 42 have inner recesses 43 and 44, respectively, conforming to the outer surface of the container body 18. Any suitable means such as plurality of clamps 46 may be employed for forcibly bringing the clamping members 41 and 42 together, these members sliding in the guideways 39.

In making a container having an end wall 34 welded therein, the end wall 34 is preferably preformed of fibrous material containing a synthetic resin binder. Thus, the end wall 36 shown in Figure 4 can be shaped by suitable dies from a sheet of laminated fibrous material impregnated with a partially reacted synthetic resin, the curing of the resin being effected during the forming of the end wall. The body portion 18 of the container and the end wall 36 are assembled over the die member 32 as shown in Figure 4 and then the clamps 46 tightened to cause the clamping members 41 and 42 to uniformly press the end of the container body 18 about the longitudinally extending portions of the end wall 36. As described with reference to Figures 1 and 2 the engaging surfaces of these members are coated with a solution of partially reacted synthetic resin and the solvent thereof allowed to dry prior to placing these members upon the die 32. The die 32 is ordinarily maintained in heated condition during the fabrication of a plurality of containers so that fusing and curing of the resin begins substantially simultaneously with tightening of the clamping members 41 and 42 to press the engaging surfaces of the container body and end wall together and cause the longitudinal portions of the end wall 36 to tightly engage the die 32. The resin is first fused so as to weld the two members together and then the resin substantially completely sets to form a substantially leakproof and shockproof joint.

It will thus be seen that I have provided a method and apparatus for effectively welding together portions of fibrous containers having a synthetic resin binder. The resin employed may be any one of various types available on the market, a phenol aldehyde resin being preferred, although various other types of similar resins such as urea aldehyde are suitable. Such resins are soluble in organic solvents when partially reacted and certain of them such as the urea formaldehyde resins are soluble in water so that they can be employed in water solution. The various portions of the containers are ordinarily made up of laminations of unsized paper or fiberboard having a resin binder of the type above described, although in many cases it is desirable to employ surfaces layers of woven fabric for the container, as such woven fabric imparts high tensile strength and resistance to cracking to the container, the nonwoven or felted fibrous laminae imparting stiffness and compression strength thereto.

While I have disclosed the preferred embodiments of my invention, it is understood that the details thereof may be varied within the scope of the following claims.

I claim:

1. The method of constructing containers of synthetic resin impregnated fibrous material, which comprises, forming a tubular body member of said material having an aperture therein, assembling in said aperture another member of said material having a surface contacting a surface of said body member adjacent said aperture, coating prior to said assembling the contacting surfaces of said members with a layer of partially reacted thermo-setting synthetic resin, and pressing said contacting surfaces together while simultaneously subjecting the same to a temperature sufficiently high to first fuse said resin layers together and then further react the resin thereof to a substantially infusible and insoluble state.

2. The method of constructing containers of synthetic resin impregnated fibrous material, which comprises, forming a tubular body member of said material having an open end providing an aperture in said body portion, assembling in said aperture an end wall of said material having a tubular portion fitting the surface surrounding said aperture, coating prior to said assembling the contacting surfaces of said members with a layer of partially reacted thermo-setting synthetic resin and pressing said contacting surfaces together while simultaneously subjecting the same to a temperature sufficiently high to first fuse said resin layers together and then further react the resin thereof to a substantially infusible and insoluble state.

3. The method of constructing containers of synthetic resin impregnated fibrous material, which comprises, forming a tubular body member of said material having an aperture in a side wall thereof, assembling in said aperture a tubular filler neck having a flanged portion contacting the side wall of said body member adjacent said aperture, coating prior to said assembling the contacting surfaces of said members with a layer of partially reacted thermo-setting synthetic resin and pressing said contacting surfaces together while simultaneously subjecting the same to a temperature sufficiently high to first fuse said resin layers together and then further react the resin thereof to a substantially infusible and insoluble state.

4. Apparatus for welding together a tubular body member of fibrous material having a synthetic resin binder and a filler neck having a tubular portion and a flange thereon, said apparatus including an inner die receiving and fitting an inner surface of said flange on said filler neck, and an outer die receiving and fitting a portion of the outer surface of said body member, said outer die having an aperture receiving the tubular portion of said filler neck, means for pressing said dies together with portions of said members positioned between said dies, and means to heat at least one of said dies during said pressing operation.

5. Apparatus for welding together a tubular body member of fibrous material having a synthetic resin binder and a filler neck having a tubular portion and a flange thereon, said apparatus including an inner die receiving and fitting an inner surface of said flange on said filler neck, and an outer die receiving and fitting a portion of the outer surface of said body member, said outer die having an aperture receiving the tubular portion of said filler neck, means for pressing said dies together with portions of said members positioned between said dies, and means to heat at least one of said dies during said pressing operation, said inner die being carried by a lever extending through said body portion.

6. The method of constructing containers of synthetic resin impregnated fibrous material which comprises forming a tubular body member of said material having an aperture therein, assembling in said aperture another member of said material having a surface contacting a surface of said body member adjacent said aperture, coating the contacting surfaces of said members with a solution of synthetic resin and a solvent thereof and drying the coating to form thin films of synthetic resin in partially reacted form prior to assembling said members in the manner described, and pressing said contacting surfaces together while simultaneously subjecting the latter to a temperature sufficiently high to first fuse said resin layers together and then further react the resin thereof to a substantially infusible and insoluble state.

7. Apparatus for welding together a tubular body member of fibrous material having a synthetic resin binder and a filler neck having a tubular portion and a flange thereon, said apparatus including an inner die receiving and fitting an inner surface of the flange on said filler neck, an outer die receiving and filling a portion of the outer surface of said member, said outer die having an opening for receiving the tubular portion of said filler neck, a movable arm which carries said inner die and which is adapted to be accommodated within said body member, said arm being operable to press said dies together with portions of said member and flange between them, and means for heating at least one of said dies.

8. Apparatus for welding together a tubular body member of fibrous material having a synthetic resin binder and a filler neck having a tubular portion and a flange thereon, said apparatus including an inner die receiving and fitting an inner surface of the flange on said filler neck, an outer die receiving and fitting a portion of the outer surface of said member, said outer die having an opening for receiving the tubular portion of said filler neck, a stationary base on which said outer die is mounted, an arm for carrying said inner die, means for pivotally supporting said arm over said base so that one end thereof and said inner die may be accommodated within said body member, said arm being operable to press said dies together with portions of said member and flange between them, and means for heating at least one of said dies.

9. Apparatus for welding together a tubular body member of fibrous material having a synthetic resin binder and a filler neck having a tubular portion and a flange thereon, said apparatus including an inner die receiving and fitting an inner surface of the flange on said filler neck, an outer die receiving and fitting a portion of the outer surface of said member, said outer die having an opening for receiving the tubular portion of said filler neck, a stationary base on which said outer die is mounted, a post connected to and extending upwardly from said base, an arm pivotally connected at one end to said post and extending over said base, means connecting said inner die to said arm for rocking movement with respect to said arm, said post and arm supporting said inner die so that it and the part of said arm to which it is connected may be accommodated within said body member, said arm being operable to press said dies together with portions of said member and flange between them, and means for heating at least one of said dies.

POWEL CROSLEY, III.

REFERENCES CITED

The following references are of record in the file of this patent:

UNITED STATES PATENTS

| Number | Name | Date |
|---|---|---|
| 2,259,256 | Maas et al. | Oct. 14, 1941 |
| 2,285,220 | Morrell | June 2, 1942 |
| 2,367,419 | Morrell | Jan. 16, 1945 |
| 1,962,213 | Reed | June 12, 1934 |
| 2,173,585 | Harrison | Sept. 19, 1939 |
| 2,244,282 | Bergstein | June 3, 1941 |
| 2,311,675 | Magill | Feb. 23, 1943 |
| 2,358,569 | Geraghty | Sept. 19, 1944 |